(12) United States Patent
Browne et al.

(10) Patent No.: US 11,378,801 B1
(45) Date of Patent: Jul. 5, 2022

(54) WIDE FIELD OF VIEW NIGHT VISION SYSTEM

(71) Applicant: Vision Products, LLC, Los Gatos, CA (US)

(72) Inventors: Michael P. Browne, San Mateo, CA (US); James A. Davey, Sunnyvale, CA (US); Martin Vasquez, Morgan Hill, CA (US)

(73) Assignee: Vision Products, LLC, Los Gatos, CA (US)

( * ) Notice: Subject to any disclaimer, the term of this patent is extended or adjusted under 35 U.S.C. 154(b) by 302 days.

(21) Appl. No.: 15/605,741

(22) Filed: May 25, 2017

(51) Int. Cl.
| | |
|---|---|
| *H04N 5/33* | (2006.01) |
| *G02B 27/01* | (2006.01) |
| *H04N 5/225* | (2006.01) |
| *H04N 5/232* | (2006.01) |
| *H04N 5/265* | (2006.01) |

(52) U.S. Cl.
CPC ..... *G02B 27/0172* (2013.01); *G02B 27/0176* (2013.01); *H04N 5/2258* (2013.01); *H04N 5/23238* (2013.01); *H04N 5/33* (2013.01); *G02B 2027/014* (2013.01); *G02B 2027/0138* (2013.01); *G02B 2027/0152* (2013.01); *G02B 2027/0156* (2013.01); *G02B 2027/0178* (2013.01); *H04N 5/265* (2013.01)

(58) Field of Classification Search
CPC .... H04N 5/33; H04N 5/2258; H04N 5/23238; H04N 5/265; G02B 27/0172
See application file for complete search history.

(56) References Cited

U.S. PATENT DOCUMENTS

| | | | |
|---|---|---|---|
| 3,410,629 A | 11/1968 | Carpenter et al. | |
| 4,599,640 A * | 7/1986 | Dischert | ............... H04N 9/045 348/265 |
| 4,698,857 A | 10/1987 | Kastendieck et al. | |
| 5,457,493 A * | 10/1995 | Leddy | ............... G02B 26/0841 250/252.1 |
| 5,473,365 A | 12/1995 | Okamura | |
| 5,572,343 A | 11/1996 | Okamura et al. | |
| 5,726,807 A | 3/1998 | Nakaoka et al. | |

(Continued)

FOREIGN PATENT DOCUMENTS

JP 2010-145674 7/2010

OTHER PUBLICATIONS

Wilburn, PhD thesis, "High Performance Imaging Using Arrays of Inexpensive Cameras", A Dissertation Submitted to the Department of Electrical Engineering and the Committee on Graduate Studies of Stanford University in Partial Fulfillment of the Requirements for the Degree of Doctor of Philosophy; 2004.

(Continued)

*Primary Examiner* — Shawn S An
(74) *Attorney, Agent, or Firm* — Fenwick & West LLP

(57) ABSTRACT

Described is a wide field of view, high resolution digital night vision system that uses transparent, repositionable eyepieces to present night vision information in the field of view of the user. The WNVS is advantageous in that it can be used in both night environments, but also in daytime environments by using clear eye pieces that allow the user to concurrently see the outside environment or allowing the eyepieces to be positioned out of the field of view of the user without significantly occluding the user's field of use during daytime use.

25 Claims, 15 Drawing Sheets

(56) References Cited

U.S. PATENT DOCUMENTS

| | | | |
|---|---|---|---|
| 6,075,644 A | 6/2000 | Filipovich | |
| 6,088,165 A * | 7/2000 | Janeczko | G02B 23/125 |
| | | | 250/214 VT |
| 6,201,641 B1 | 3/2001 | Filipovich | |
| 6,407,724 B2 | 6/2002 | Waldern et al. | |
| 6,462,894 B1 | 10/2002 | Moody | |
| 6,560,029 B1 | 5/2003 | Dobbie et al. | |
| 6,653,989 B2 | 11/2003 | Nakanishi | |
| 6,757,008 B1 | 6/2004 | Smith | |
| 7,072,107 B2 | 7/2006 | Filipovich et al. | |
| 7,158,296 B1 | 1/2007 | Schwartz, II et al. | |
| 7,289,272 B2 | 10/2007 | Bowron et al. | |
| 7,307,793 B2 | 12/2007 | Ottney et al. | |
| 7,381,952 B2 | 6/2008 | Teich et al. | |
| 7,806,533 B2 | 10/2010 | Boute et al. | |
| 8,736,967 B1 | 5/2014 | Browne et al. | |
| 8,817,196 B2 | 8/2014 | De La Tocnaye et al. | |
| 9,615,067 B1 * | 4/2017 | Foote | H04N 7/185 |
| 2003/0129567 A1 | 7/2003 | Cabato et al. | |
| 2003/0231804 A1 | 12/2003 | Bacarella et al. | |
| 2004/0227703 A1 | 11/2004 | Lamvik et al. | |
| 2005/0046702 A1 | 3/2005 | Katayama et al. | |
| 2006/0291849 A1 * | 12/2006 | Shamir | G03B 7/08 |
| | | | 396/334 |
| 2007/0247517 A1 * | 10/2007 | Zhang | G06K 9/2018 |
| | | | 348/30 |
| 2008/0136923 A1 | 6/2008 | Inbar et al. | |
| 2008/0170119 A1 * | 7/2008 | McCann | G02B 27/017 |
| | | | 348/113 |
| 2008/0309774 A1 | 12/2008 | Beng Goh et al. | |
| 2009/0051760 A1 | 2/2009 | Ottney | |
| 2009/0251680 A1 | 10/2009 | Farsaie | |
| 2010/0128135 A1 * | 5/2010 | Filipovich | G02B 23/125 |
| | | | 348/217.1 |
| 2012/0002064 A9 | 1/2012 | Filipovich et al. | |
| 2012/0081545 A1 * | 4/2012 | Jin | G01B 11/022 |
| | | | 348/141 |
| 2012/0119978 A1 | 5/2012 | Border et al. | |
| 2012/0182326 A1 | 7/2012 | Moore | |
| 2012/0257005 A1 | 10/2012 | Browne | |
| 2013/0234935 A1 | 9/2013 | Griffith | |
| 2014/0247323 A1 * | 9/2014 | Griffis | H04N 5/23238 |
| | | | 348/36 |
| 2017/0237913 A1 * | 8/2017 | Kiser | G02B 27/108 |
| | | | 348/262 |

OTHER PUBLICATIONS

Moore, S.A., "Anamorphic Eyepiece for Increased Field of View," International Optical Design Conference (IODC), Jun. 13, 2010, Jackson Hole, WY, 5 pages.

* cited by examiner

WIDE FIELD OF VIEW NIGHT VISION SYSTEM

GOVERNMENT RIGHTS LEGEND

This invention was made with government support under Phase I SBIR Government contract N68335-11-C-0128 and Phase II SBIR Government contract N68335-12-C-0185 awarded by the United States Navy. The government has certain rights in the invention.

BACKGROUND

1. Field of Art

This application relates to the field of night vision systems, and particularly to the field of head mounted night vision systems.

2. Description of the Related Art

While flying, helicopter pilots need a wide field of view to maintain situational awareness. This is especially important for flying at low altitudes during low light situations. Most existing night vision goggle (NVS) systems only provide a 40° field of view. Attempts to expand the field of view of these traditional systems has resulted in unacceptable reductions in resolution, or significant increases in weight that do not allow for ease of use in tactical situations such as those encountered by helicopter pilots. Further, existing wide field of view night vision goggle systems can cover 80-90°, however they employ a direct view system. As a result, the users are not able to concurrently see the surrounding environment during use. Furthermore, these direct view systems also block significant portions of a user's peripheral view.

Another common problem with existing night vision systems is that they commonly use analog image intensifier tubes. These are bulky from a forward projection perspective, and are heavy enough to create fatigue when used over long periods of time. This makes their use during long missions problematic.

Additionally, helicopter pilots have need for heads up display (HUD) systems that can provide augmented objects and information in near real-time. Some NVS can be coupled to separate, additional eye pieces to add this functionality, however there is a need for an integrated system.

SUMMARY

Described is a wide field of view, high resolution digital night vision system (referred to as the WNVS system for simplicity) that uses transparent, repositionable eyepieces to present night vision information in the field of view of the user. The WNVS system is advantageous in that it can be used in not only night environments, but also in daytime environments by using transparent eye pieces that allow the user to concurrently see the outside environment or allowing the eyepieces to be positioned out of the field of view of the user without significantly occluding the user's field of view during daytime use.

Due to the use of digital night vision sensors, as opposed to more traditional image intensifiers, the WNVS system has reduced weight, allowing for extended periods of use. On the whole, the system is particularly suited for use in operating contexts where the WNVS system is worn for extended periods that transition between night time, where night vision is needed, and daytime, where night vision is not needed, without removal of the WNVS system from the user's head, and without compromising the user's carrying out of their tasks during that entire extent.

The WNVS system has the advantage of not only providing high-resolution wide field of view WNVS images, but it does so with little latency using an image processing computing architecture that has sub-frame latency. This is achieved through at least one synchronization step within the image processing pipeline. This step ensures that pixels from the same point in the pixel grid of each of the multiple digital night vision sensors captured at the same point in time are processed together. This occurs throughout the entire subsystem, from the input of pixel information from the night vision sensors, to their ultimate endpoint, as output to digital displays emitting light for presentation as night vision and/or as HUD overlay information. Thus, the latency is sub-frame at least in the sense that the image processing pipeline handles a stream of pixels, and processes them at the pixel level, rather than at the line or whole frame level.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. Physical Structure

Figure 3A:
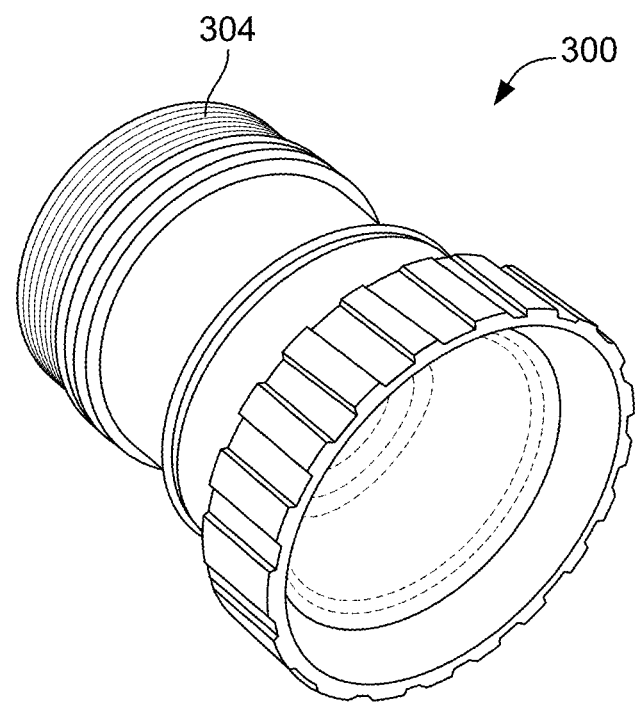
FIG. 3A is a perspective view of the front end of an objective lens barrel of the WNVS, according to one embodiment.
Figure 3B:
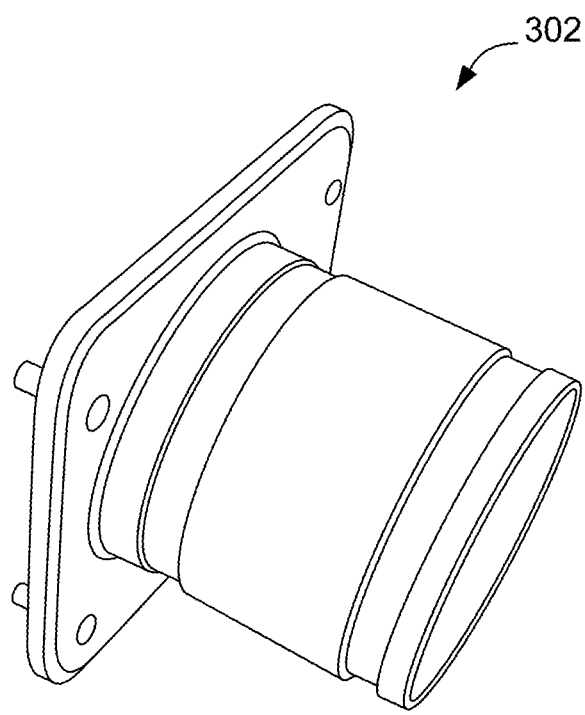
FIG. 3B is a perspective diagram of the rear end of an objective lens barrel of the WNVS, according to one embodiment.

FIGS. 1A-1G illustrate various views of an example WNVS, according to one embodiment. FIGS. 2A-2D illustrate various substructures of the example WNVS, according to one embodiment. FIGS. 3A and 3B illustrate perspective views of an objective lens barrel of a WNVS, according to one embodiment. These FIGS. are discussed together in the following section.

I.A. Imaging Subsystem

The WNVS system includes an imaging subsystem which itself includes those components of the WNVS system that relate to the capture of ambient input light from the external environment, thereby generating an input pixel stream that is output into an image processing electronics 302. The imaging subsystem includes a frame 100, night vision sensors 200, objective lens barrels 102, input objective lenses 104, sensor processing assembly 202, cable 116, and display driver 118.

The frame 100 fixedly supports the various components of the imaging subsystem above the user's field of vision. The frame 100 is configured so that the components maintain a given alignment relative to each other. Specifically, a number of objective lens barrels 102 are affixed to the frame 100. The input objective lenses 104 are located inside the objective lens barrels 102. Each night vision sensor 200 is affixed to the frame 100 behind a corresponding one of the input objective lenses 104, so as to receive light passing through that lens. The affixing may be accomplished via bonding or another similar technique. In one specific embodiment, the objective lens barrel 102 includes a front end 300 (seen in FIG. 3A) with threads 304 that screw into a back end 302 (seen in FIG. 3B). The night vision sensor is bonded to the back end 302 of the objective lens barrel 102.

The sensor processing assembly 202, discussed in Section III.A, as part of the image processing pipeline, is located inside the frame, and is electrically coupled to the night vision sensors 200. The sensor processing assembly 202 receives an input pixel stream of data from the night vision sensors 200 and provides the input pixel stream to a video processor 304. The video processor 304 incorporates any overlay information and manipulates the input pixel stream to create an output pixel stream that is provided to the displays 106 for display to the user through output optics 212.

It can be advantageous for the frame 100 to be of unitary construction. A unitary frame 100 is illustrated in the embodiment of FIG. 1. Unitary construction mitigates the number of ways that misalignment can happen by reducing component count and increasing rigidity for the WNVS, and thus reducing system complexity and the number of places where misalignments can be introduced. A unitary frame 100 can be constructed by direct metal laser sintering (DMLS), another additive metal fabrication manufacturing technique, or produced via another technique such as machining out of a solid block of metal. DMLS particularly reduces cost and allows easy fabrication of a geometrically complex structure that would not be easily possible using traditional manufacturing approaches.

The frame 100 can also contain slits (not labeled) along the sides and top of the frame 100 that allow for airflow for cooling the electronics 302. The slits can be open holes in the frame or they can be covered with a screen to prevent debris from directly entering the internal cavity of the frame 100. Alternatively, the slits could be used as cooling fins, without having holes for through airflow. The frame 100 can also include screw holes 208 to couple the frame 100 to a mounting bracket 206 (further described in Section I.C). Alternatively, the frame 100 could be coupled to the mounting bracket 206 via clips, braces, or another coupling mechanism.

The imaging subsystem contains a number of sets of input objective lens assemblies, each such set including its own objective lens barrel 102, corresponding input objective lens 104, and night vision sensor 200. Each set can be orientated off axis from each other set. This allows the WNVS to capture a wide field of view of the outside environment in front of the user. The imaging subsystem illustrated in FIG. 1 contains three sets, one pointing forward, one pointing left, and one pointing right. The system in FIG. 1 can achieve a horizontal field of view between 10° and 180°, a vertical field of view between 5° and 90° and an overlap between 10° and full overlap (see Table 1). In other embodiments, the WNVS may contain additional or fewer objective lens assemblies and depending upon the sensors used, may have different horizontal and/or vertical fields of view at varying pixel resolutions.

The input objective lenses 104 focus outside light from the environment onto the night vision sensors 200. The input objective lenses 104 can each be a single lens or a combination of several optical elements housed in the objective lens barrel 102.

The night vision sensors 200 amplify ambient light rays that travel from the environment through the input objective lenses 104 and objective lens barrel 102. The night vision sensors 200 are compact and highly-sensitive digital-optical sensors that do not include image intensifier tubes. Example night vision sensors are ISIE11 sensors (1600×1200 pixel image (frame) format, 60 Hz frame rate, snapshot or rolling shutter modes) made by Intevac™, or Indium Gallium Arsenide (InGaAs) sensors (1280×1024 pixel image format, 60 frames per second) made by Sensors Unlimited™.

The sensor processing assembly 202 comprises a printed circuit board (PCB), a high voltage (HV) power supply for each night vision sensor 200, and coupling wires. The sensor processing assembly 202 and its functions will be further described in Section III.A.

The one or more cables 116 couples various electronic components of the WNVS to other electronic components. The embodiment of FIG. 1 specifically illustrates a single cable 116 sheathing a number of smaller cables including two miniature RG 179 coax, two High-Definition Multimedia Interface (HDMI) cables, a 12V direct current (DC), and a 5V DC. One of the RG 179 coax couples the output of the sensor processing assembly 202 to the input of the video processor 304, and the other couples the output of the video processor 304 to the display driver 118. The two HDMI cables (referred to as the display cables 204) each couple the output of the display driver 118 to one of the distinct displays 106 of the eyepiece subsystem. The 12V DC powers the imaging subsystem and the 5V DC powers the display driver 118. In other embodiments, other cabling and power arrangements may be used.

The display driver 118 is secured to the helmet 114 and is coupled via the cable 116 to the output optics 122 and the video processor 304. The display driver 118 may be integrated into the video processor. The display driver 118 and its functions will be further described in Section III.

I.B. Eyepiece Subsystem

The WNVS system also includes an eyepiece subsystem which itself includes those components of the WNVS system that relate to the display of night vision imagery (including any desired overlay) to the eyes of the user based on image data output by the image processing subsystem. The eyepiece subsystem is seen in FIGS. 1, 2, and 5 and includes an alignment apparatus 110, output optics 122 (including displays 106), display cables 204, and adjustment knobs 120, 506, and 512. Note that the display cables are not shown in FIG. 5.

The alignment apparatus 110 is physically coupled to the imaging subsystem. The alignment apparatus is also physically coupled to the output optics 122. To maintain an even weight distribution, the alignment apparatus 110 is generally mounted to the center of the frame 100. The display cables 204 run through the imaging subsystem and are routed to couple to the output optics 122. The adjustment knobs 120 protrude from the sides of the alignment apparatus 110. The individual components of the output optics 122 will be described in detail in Section II.B.

Vertically, the alignment apparatus 110 is located below the imaging subsystem and above the user's eye level along a vertical axis of the user's face running from forehead to chin. This can be seen in FIG. 1. The alignment apparatus 110 permits the output optics 122 to be repositioned in three dimensions relative to the imaging subsystem: vertically along the long axis of the user's face from chin to hairline, forward and backward perpendicularly to the plane of the user's face (fore-aft), and laterally along the short axis of the user's face. This allows different users to reposition the output optics 122 directly in front of their eyes. This is performed by the user using the lateral 120, vertical 506, and fore-aft 512 adjustment knobs. In one embodiment, the adjustment knobs 120 are configured to uniformly move both the left and right output optics 122 simultaneously to adjust interpupillary distance. In another embodiment, each eyepiece's positioning over the eye can be independently controlled by a separate adjustment knob 120. Although the illustrated alignment apparatus 110 describes the use of adjustment knobs, in other embodiments another type of control may be used to align the output optics 122, examples of which include but are not limited to sliders, locks, movable pressure fits, screws, or any other similar mechanism.

Figure 1A:
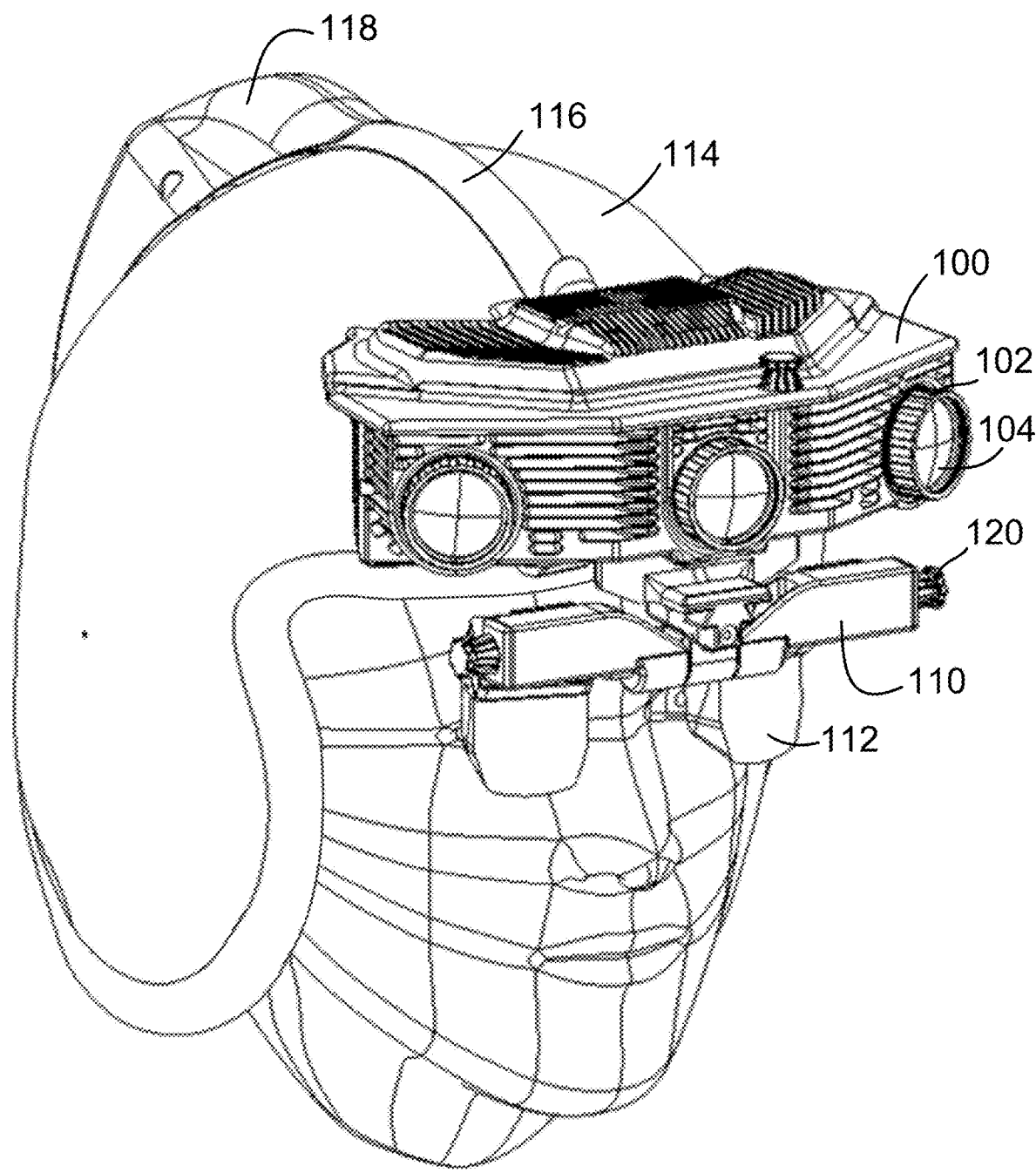
FIG. 1A is a perspective view of a WNVS system, according to one embodiment.
Figure 1B:
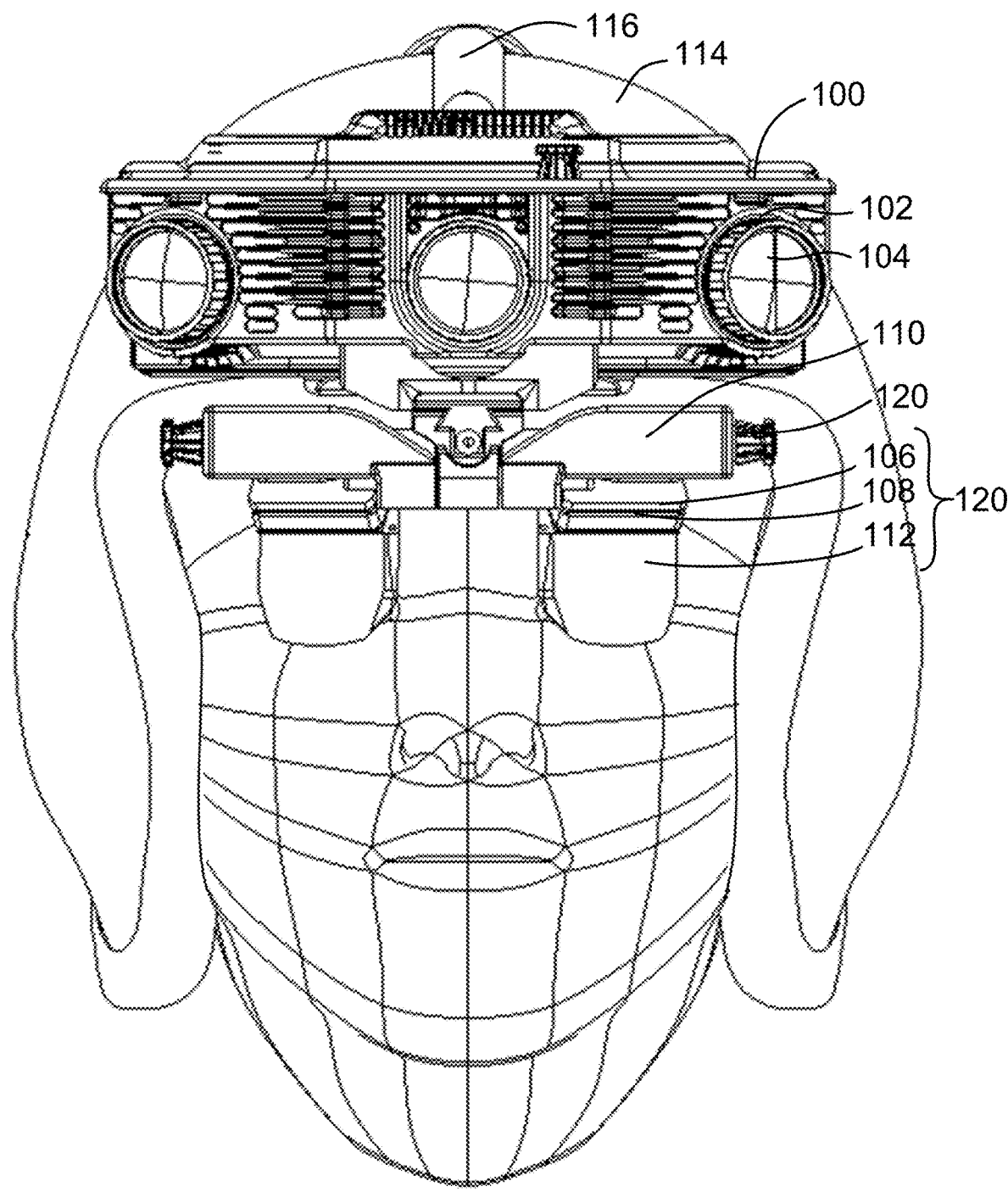
FIG. 1B is a front view of the WNVS, according to one embodiment.
Figure 1C:
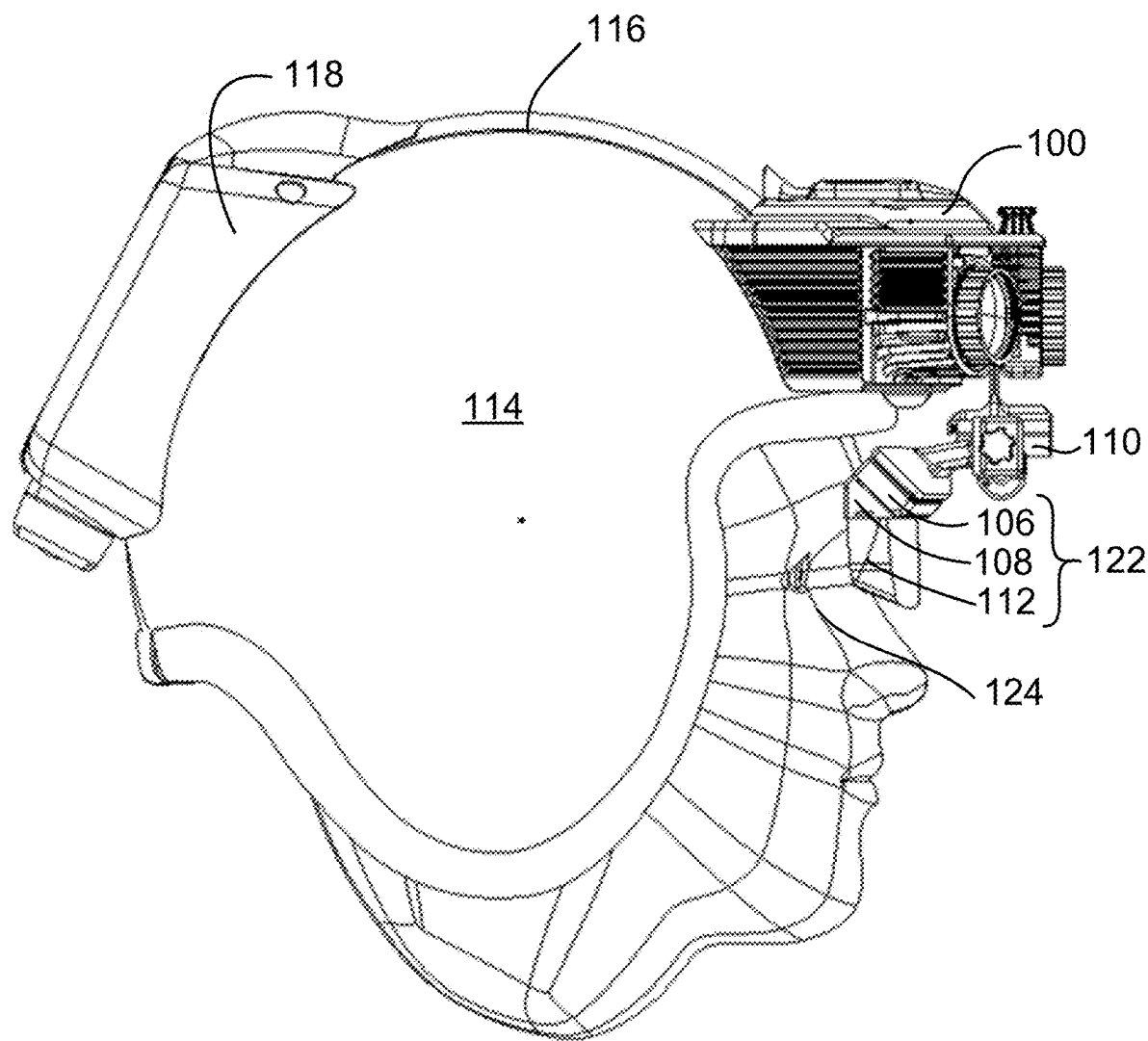
FIG. 1C is a side view of the WNVS, according to one embodiment.
Figure 1D:
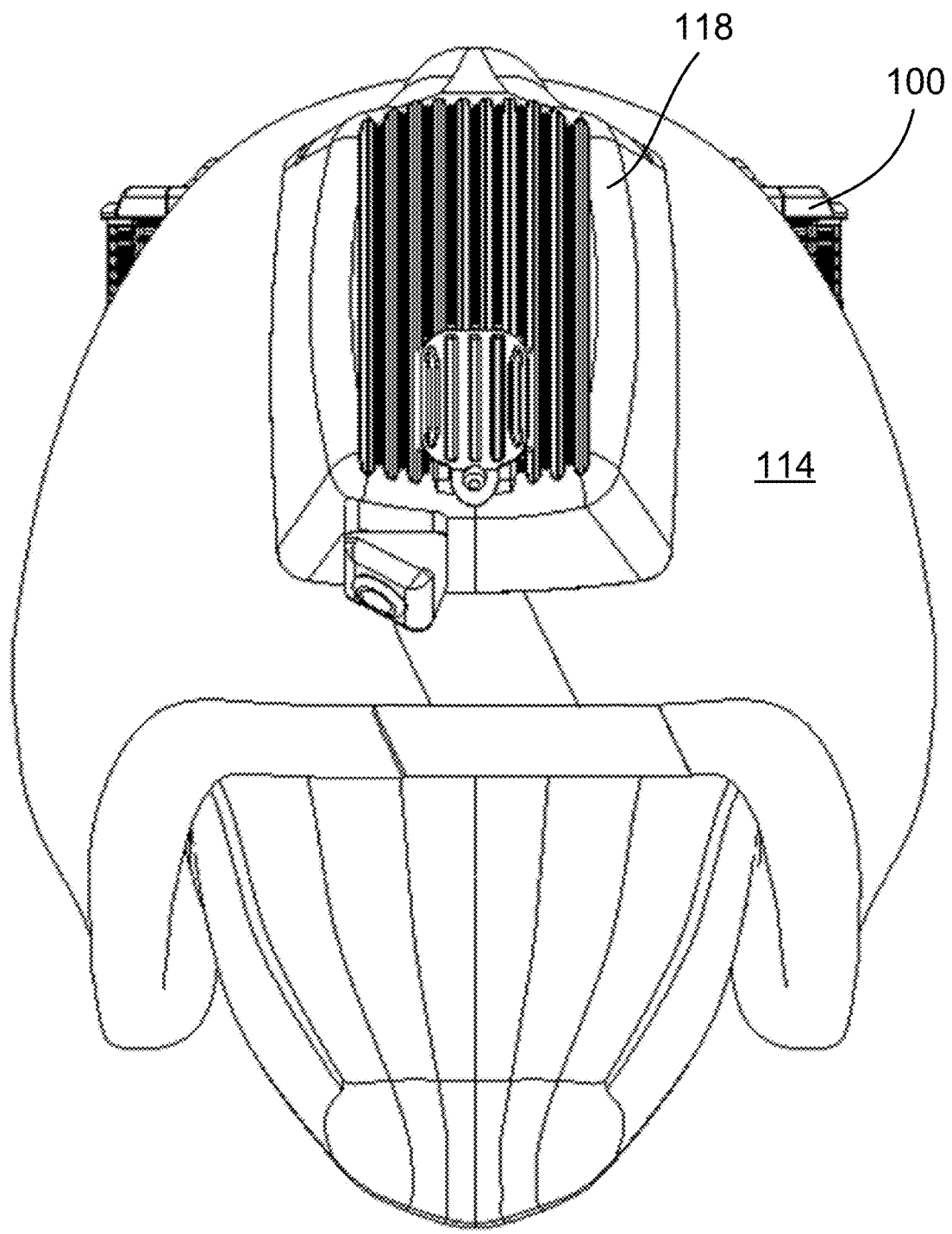
FIG. 1D is a rear view of the WNVS, according to one embodiment.
Figure 1E:
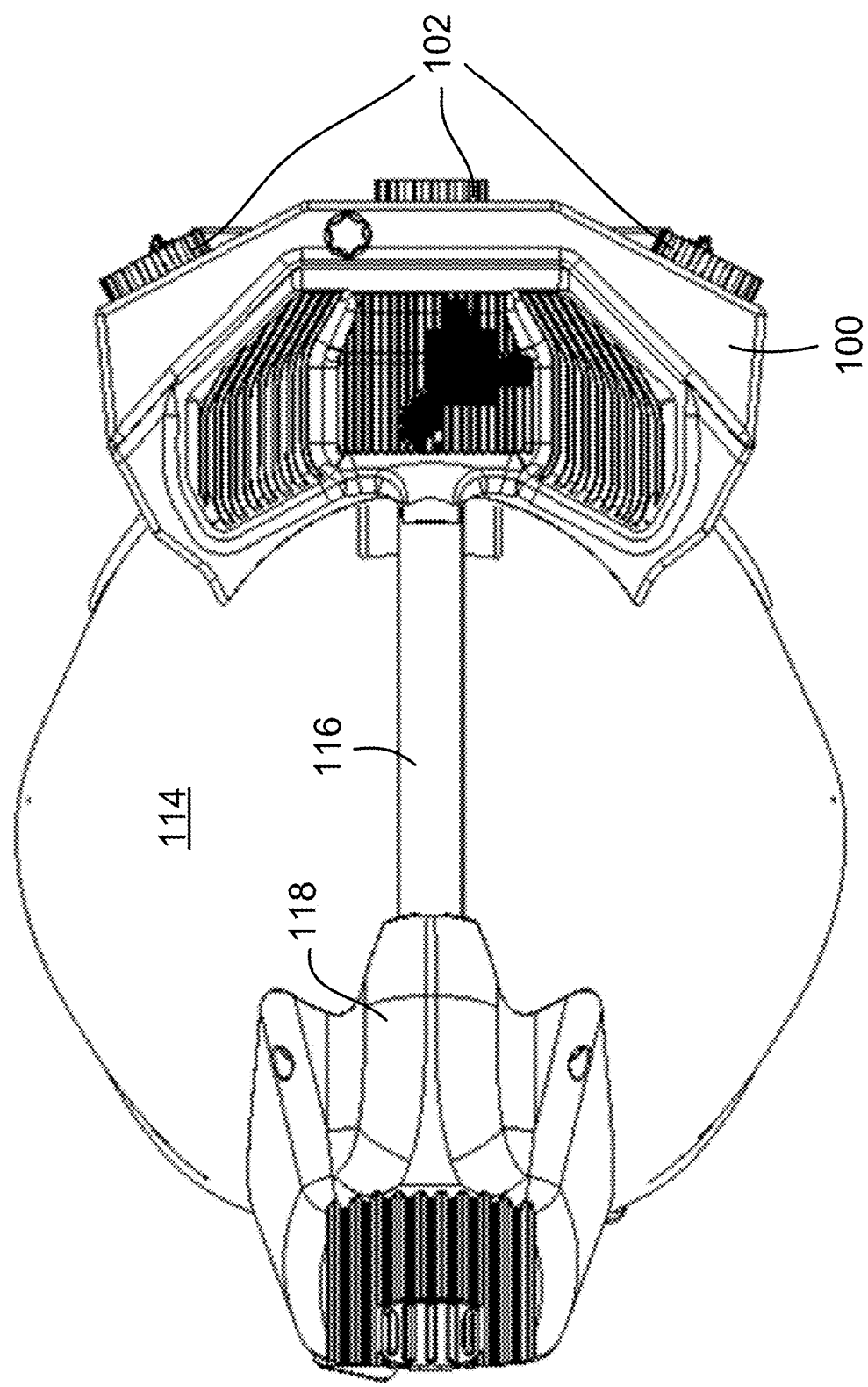
FIG. 1E is a top view of the WNVS, according to one embodiment.
Figure 1F:
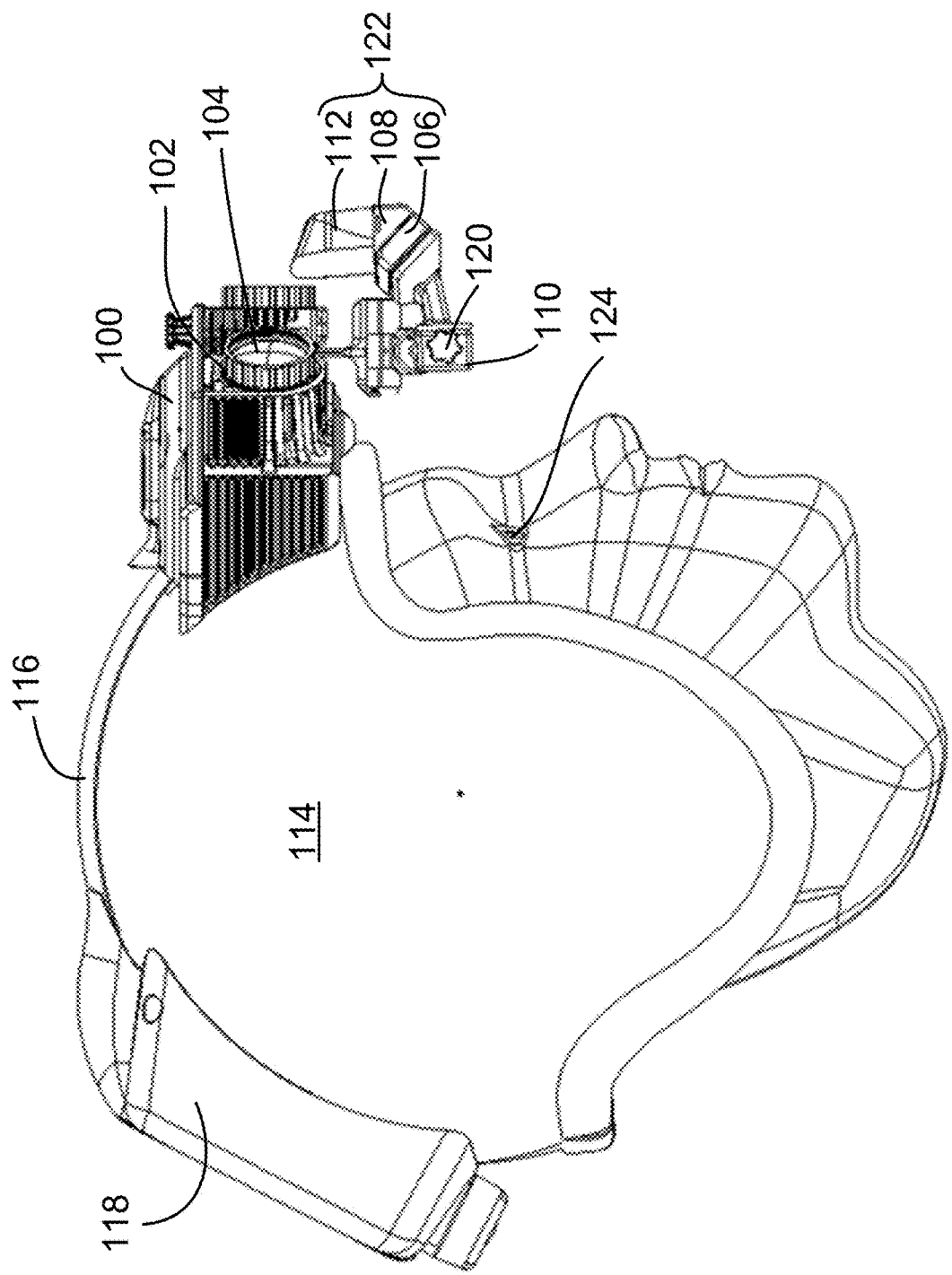
FIG. 1F is a side view of the WNVS, with the output optics in the flipped up position, according to one embodiment.
Figure 1G:
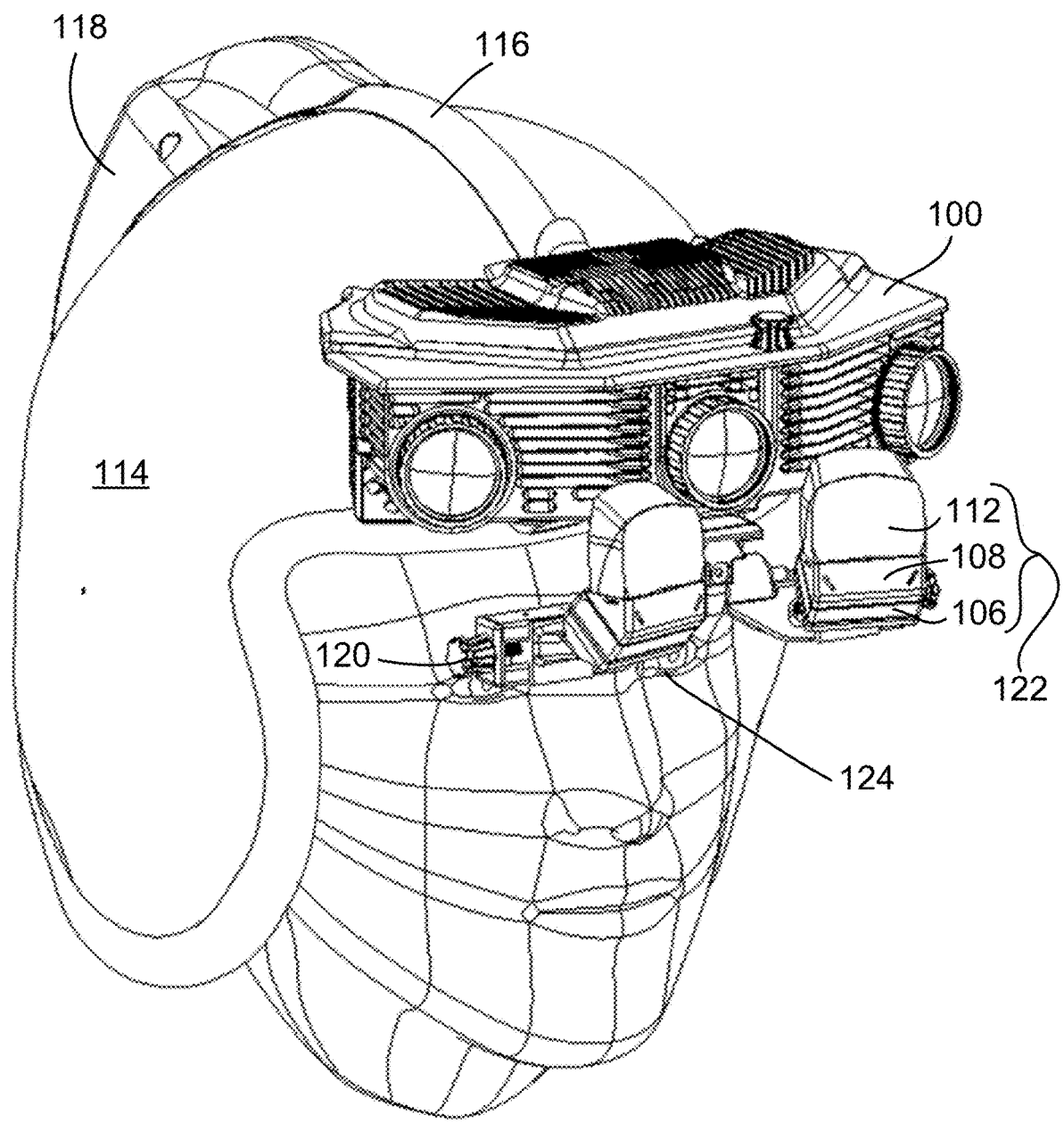
FIG. 1G is a perspective view of the WNVS, with the output optics in the flipped up position, according to one embodiment.
Figure 2A:
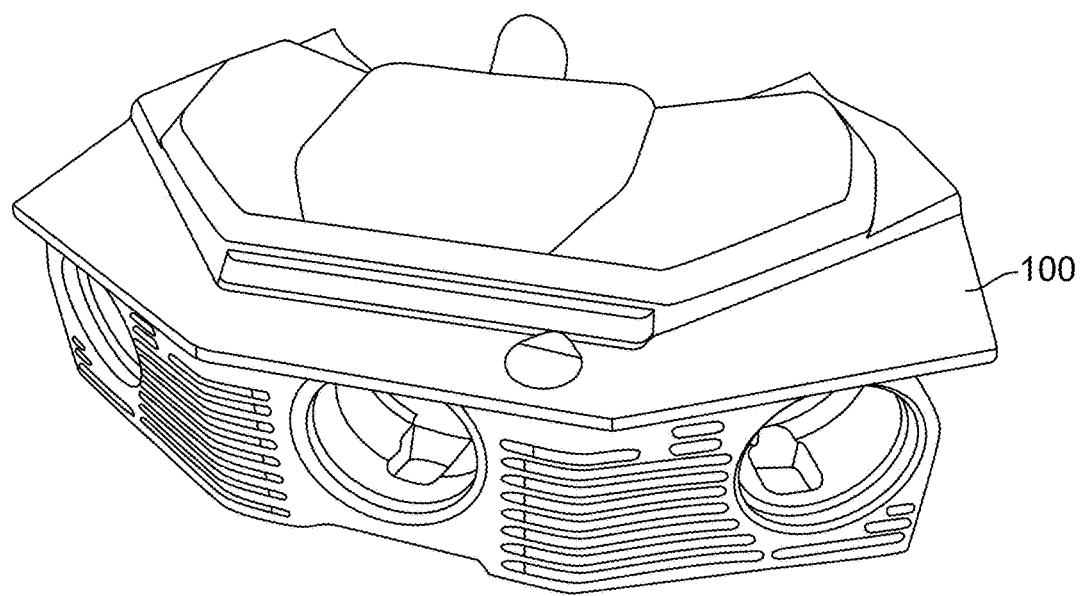
FIG. 2A is a perspective view of the frame of the WNVS detached from the helmet, according to one embodiment.
Figure 2B:
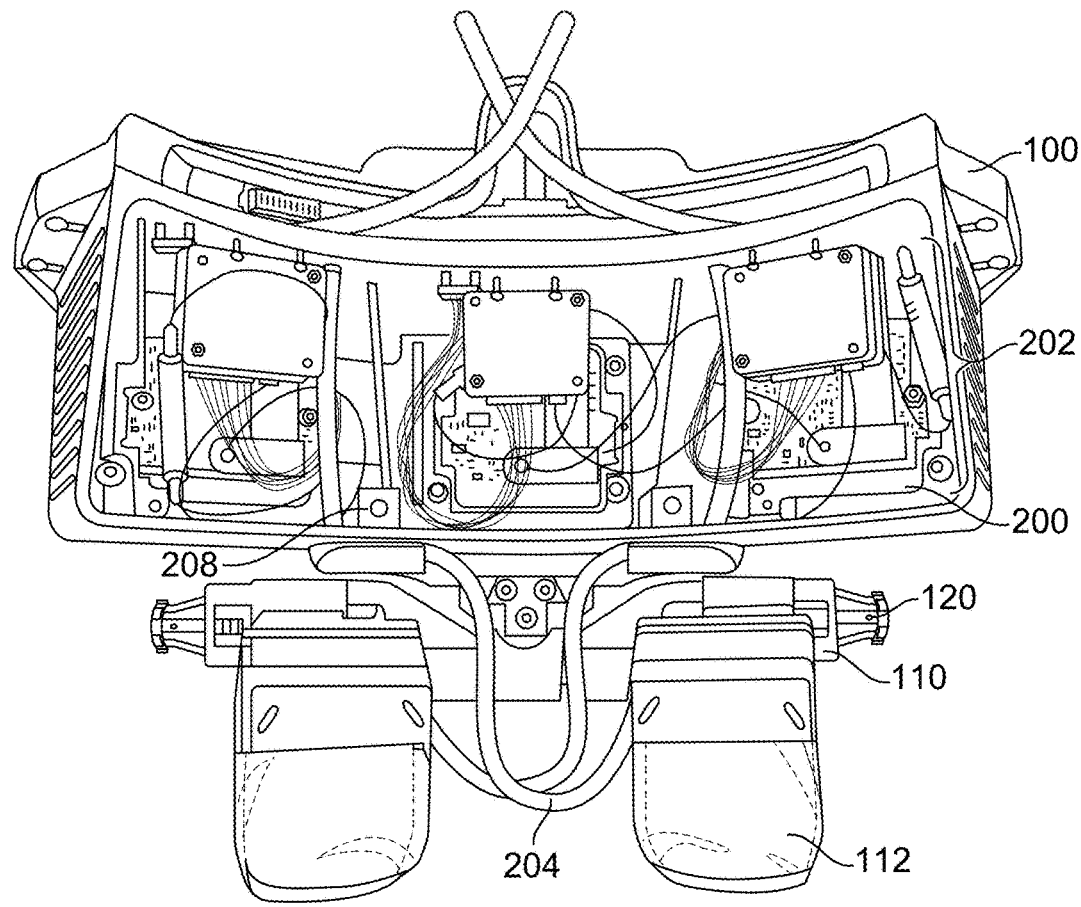
FIG. 2B is a rear view of the frame of the WNVS, revealing the night vision sensors and the sensor processing assembly, according to one embodiment.
Figure 2C:
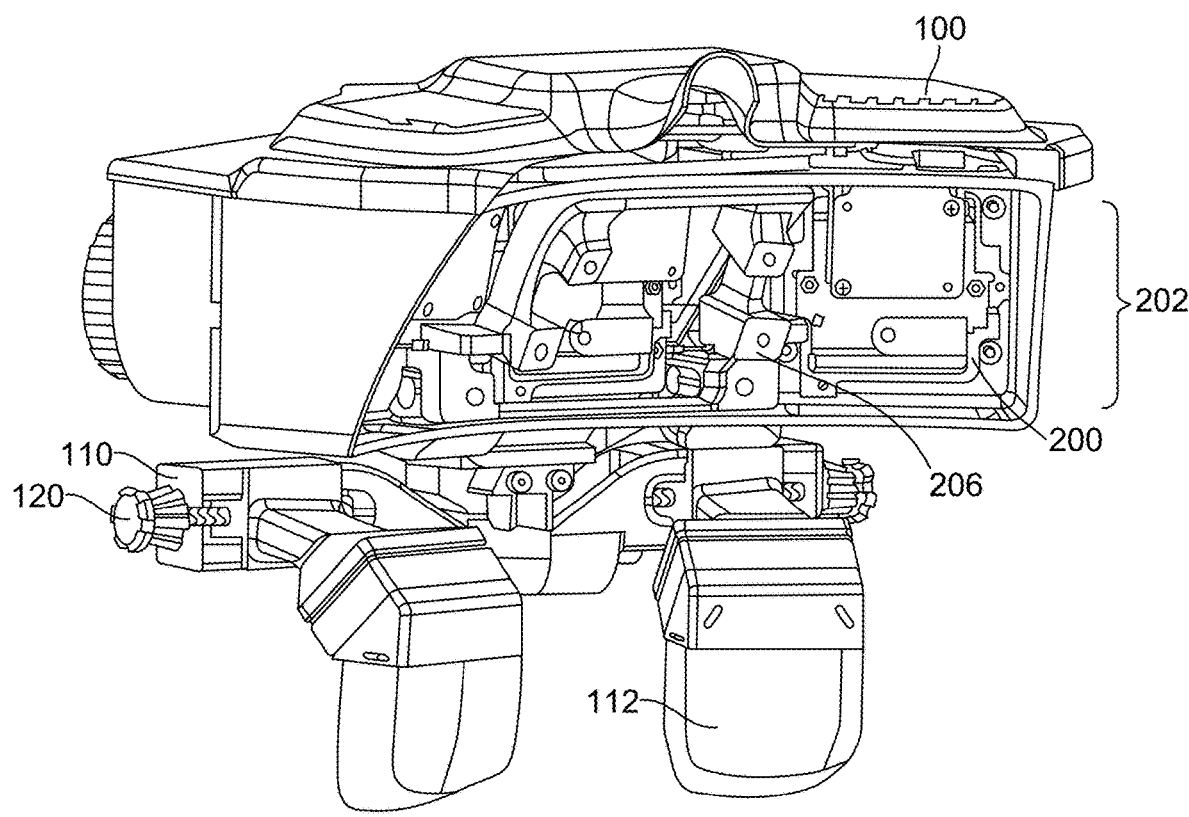
FIG. 2C is a perspective view of the frame of the WNVS, revealing the night vision sensors, the sensor processing assembly, and mounting bracket, according to one embodiment.
Figure 2D:
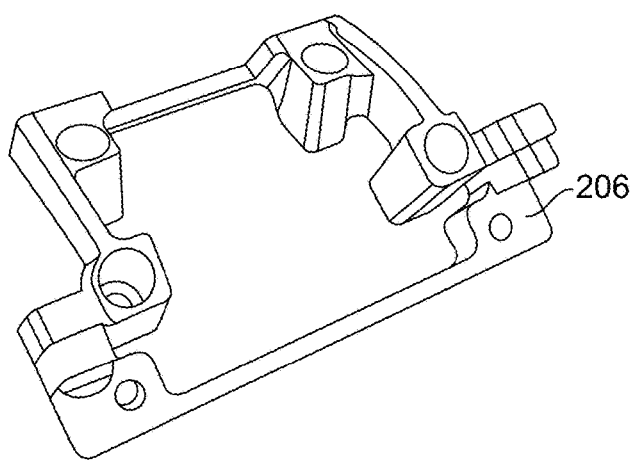
FIG. 2D is a perspective view of the mounting bracket of the WNVS, according to one embodiment.

The alignment apparatus 110 is physically configured so that the output optics 122 are repositionable into multiple positions (illustrated in FIGS. 1F and 1G). The output optics 122 can be positioned in a "flipped down" position so that the output optics 122 are able to provide night vision images to the user's eye while also not significantly obstructing the user's field of view. The output optics 122 can also be positioned in a "flipped up" position more fully out of the user's field of view. Both positions allow the user to view the surrounding environment largely unobstructed by the output optics 122.

Despite only being minimally obstructive of the user's field of view, the WNVS does somewhat obstruct the user's field of view of the surrounding environment in the "look up" direction directly above their eyes. The obstruction is due to the alignment apparatus 110 and knobs 120. In the flipped up position, this obstruction is slightly increased by the presence of the flipped up optics, with the tradeoff being that now the output optics 122 no longer obstruct the user's front field of view. Generally, this tradeoff is advantageous, as having a forward field of view be completely (rather than minimally, as in the flipped down mode) unobstructed is of primary importance, and obscuring the look up direction is less harmful, as the user can always pivot their head upward, if need be. In addition, the head mount (helmet or other system) already limits field of view in the look up direction. Notably, the WNVS provides no obstruction in the "look down" direction, which is generally a more important field of view than the look up direction in a piloting use case as instrument panels and other controls are more often located in this direction. In addition, obscurations in the look down direction have a negative impact on a pilot's ability to look at the ground while landing or taking off.

Beyond alignment, the eyepiece subsystem as a whole can be repositioned relative to the imaging subsystem. This particularly allows the positioning of the night vision sensors 200 (and input optics 300, more generally) to be independent from the positioning of the output optics 122. Exactly how the repositioning is accomplished may vary by implementation. In one implementation, the alignment apparatus 110 has a vertical fork that slides along a travel path defined by the frame 100 (or vice versa), which as above is physically coupled to the imaging subsystem. Motion of the alignment apparatus 110 relative to the frame 100 thus does not affect the motion of the night vision sensors 200 (or input optics 300, more generally). In other implementations, repositioning mechanisms other than a vertical fork may be used, movable pressure fits, screws, or other similar mechanisms.

Figure 5A:
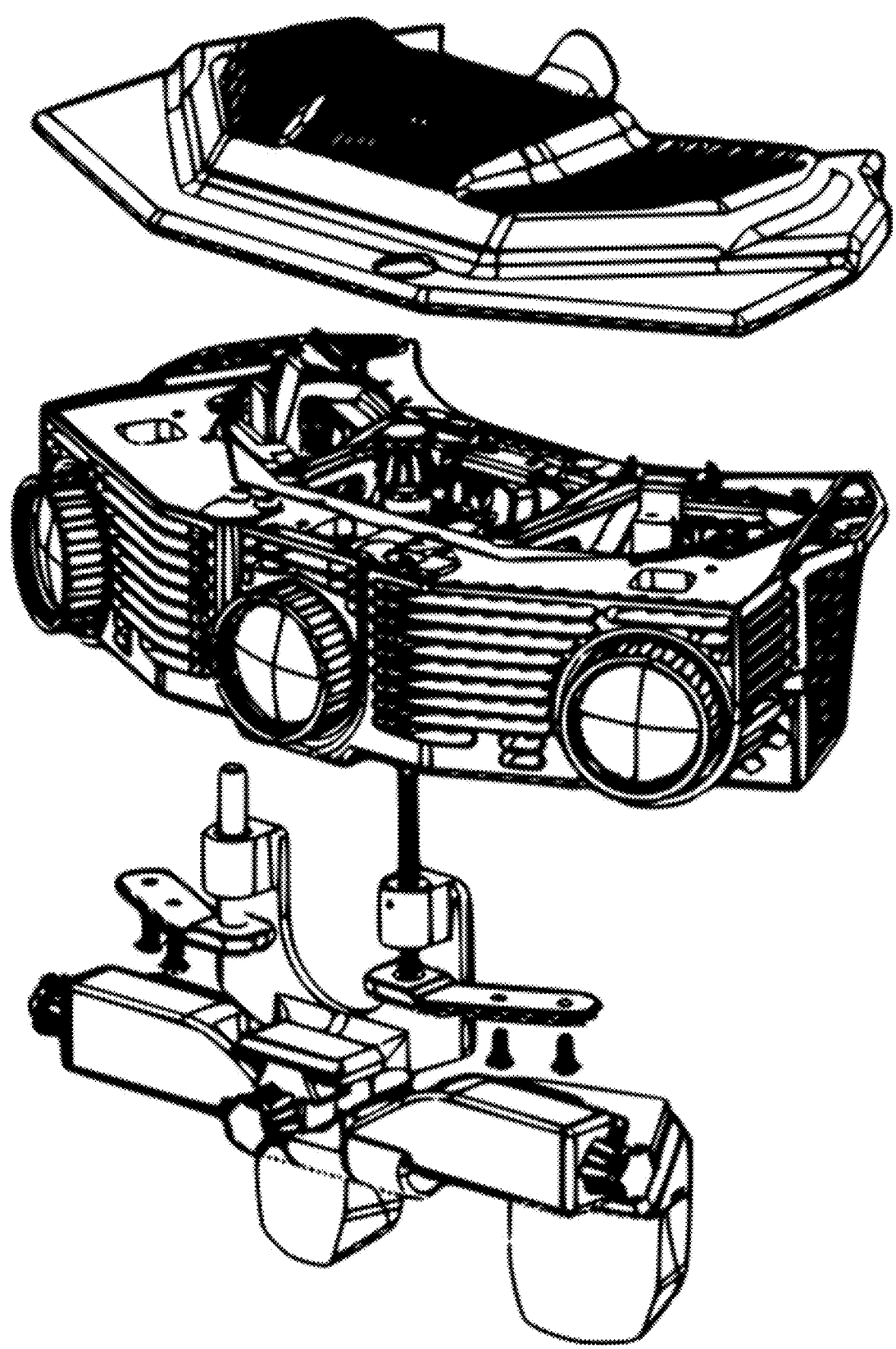
FIG. 5A is an exploded perspective view of the frame, eyepiece subsystem, and imaging subsystem of the WNVS, according to one embodiment.
Figure 5B:
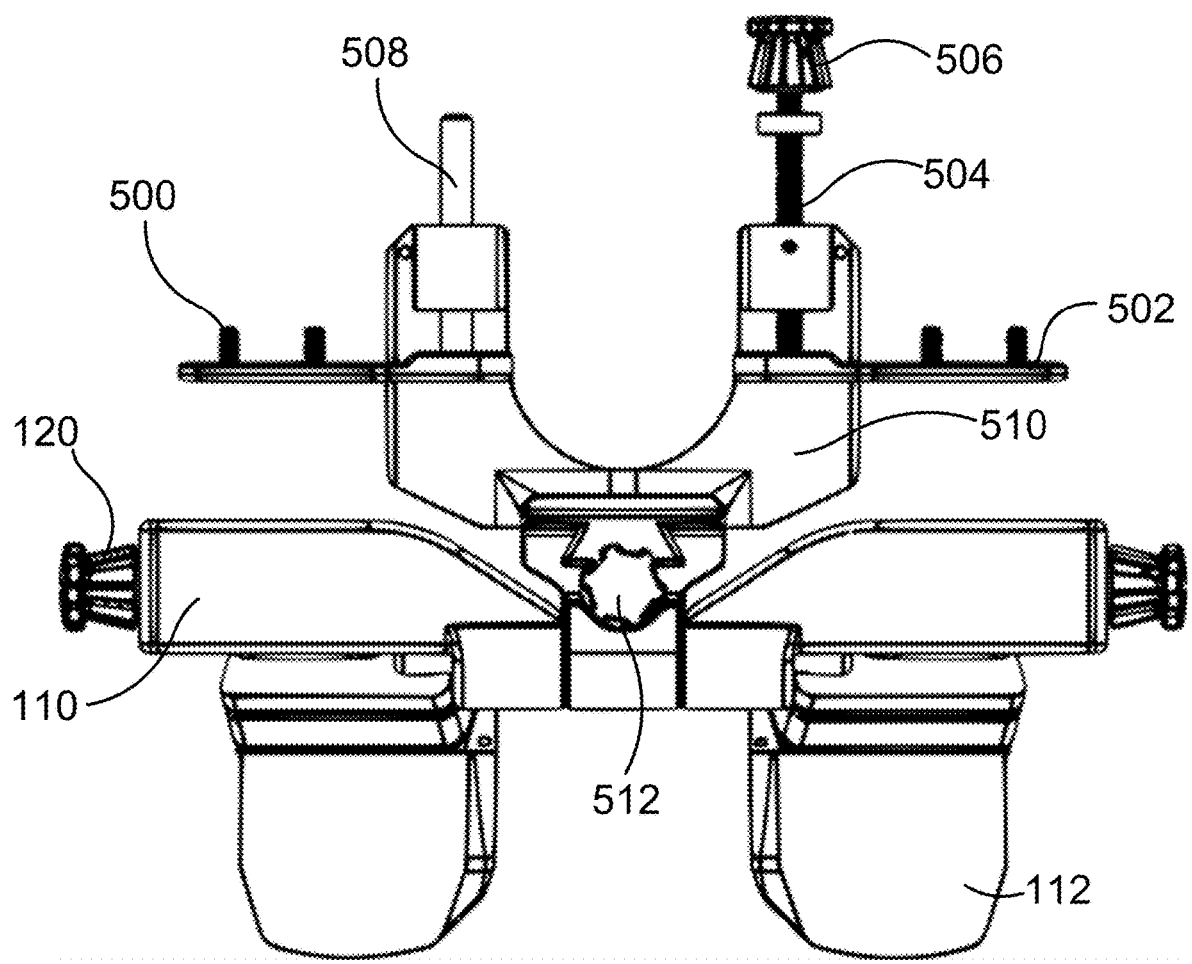
FIG. 5B. is a front view of the eyepiece subsystem of the WNVS detached from the frame, according to one embodiment.

Additional views of the eyepiece subsystem (without the display cables 204) can be seen in FIGS. 5A and 5B. FIG. 5A is an exploded perspective view of the frame, eyepiece subsystem, and imaging subsystem of the WNVS, according to one embodiment. FIG. 5B. is a front view of the eyepiece subsystem of the WNVS detached from the frame, according to one embodiment. Within FIG. 5B a chassis guide shaft bracket 500, chassis lead screw bracket 502, vertical lead screw 504, vertical adjustment knob 506, vertical guide shaft 508, vertical/fore-aft mount 510, and fore-aft adjustment knob 512 are seen.

The eyepiece subsystem can be coupled to the frame 100 by two brackets on each side (chassis guide shaft bracket 500 and chassis lead screw bracket 502). The vertical lead screw 504, vertical adjustment knob 506, and vertical guide shaft 508 are held in place with features in the frame 100 (not shown). By rotating the vertical adjustment knob 506, the vertical/fore-aft mount 510, fore-aft adjustment knob 512, and output optics 122 move vertically up and down. The presence of the vertical lead screw 504 and the vertical guide shaft 508 allows the alignment mechanism 110 to be centered on the frame 100 thus ensuring an even load balance, while also making adjustment via knob 506 even and avoiding the de-alignment of the system when that adjustment occurs.

Figure 3C:
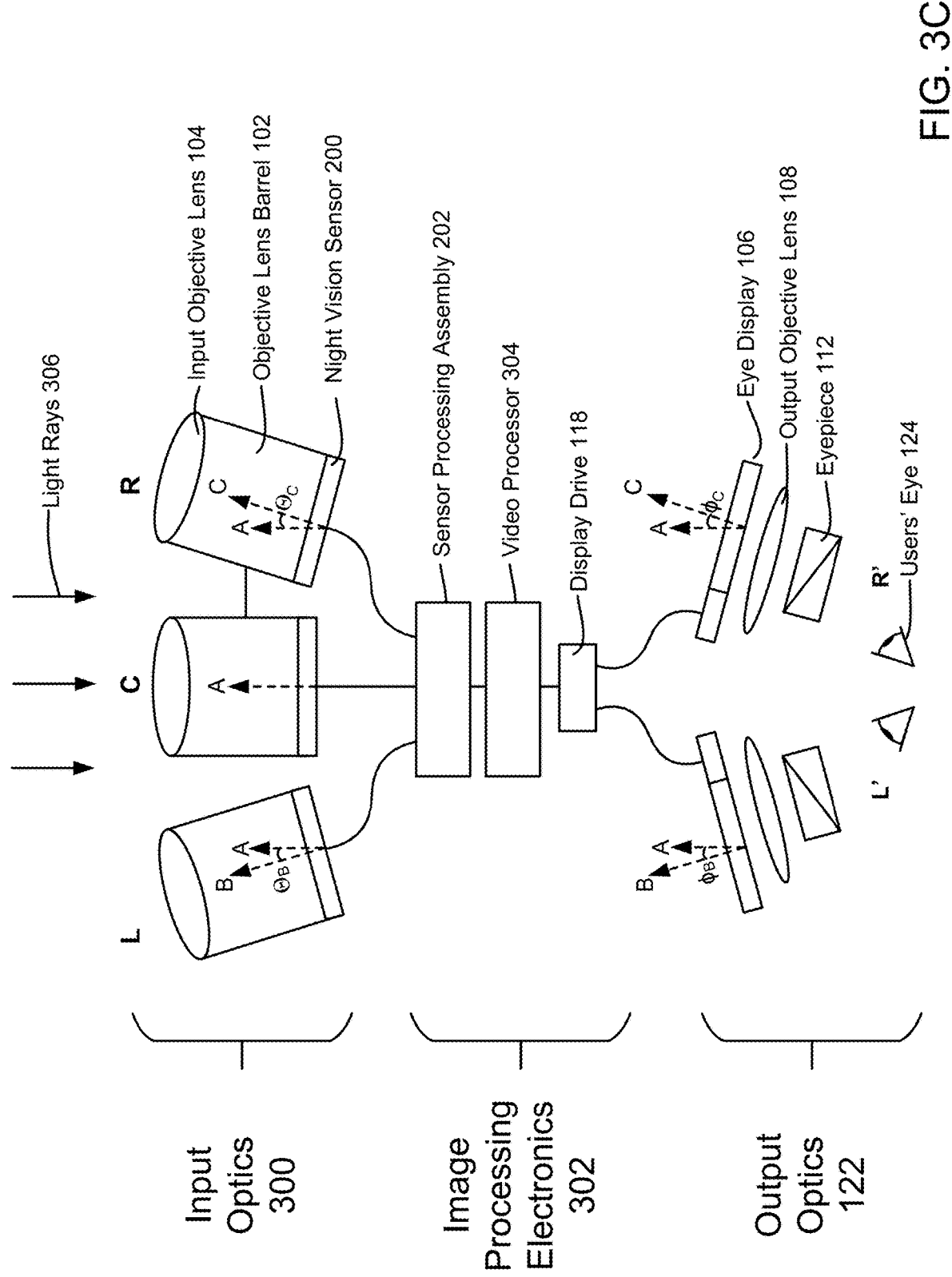
FIG. 3C is an illustration of the input optics, image processing electronics, and output optics of the WNVS, according to one embodiment.

Maintaining alignment between the imaging subsystem and the output optics 122 is an important function of the alignment apparatus 110, especially during movement, vibration or after an impact. As seen in FIG. 3C, the angles ($\Theta_B$, $\Theta_C$) of the night vision sensors 200 are maintained relative to the angles of the display optics 122 ($\Phi_B$, $\Phi_C$).

I.C. Helmet

The WNVS is designed to be worn on a user's head. It is particularly suited, for example, for use by helicopter pilots.

The WNVS includes a bracing mechanism for securing the WNVS to the user's head, such as a helmet 114 (as illustrated), straps, or another form of harness. In the illustrated embodiment, the imaging subsystem (coupled to the eyepiece subsystem) is mounted to the helmet 114. The frame 100 is mounted to the helmet 114 with a mounting bracket 206 (see FIGS. 2C and 2D). The mounting bracket is secured to the helmet 114 and the frame 100 with screws or other fastening devices. The display driver 118 and cables 116 are secured to the back of the helmet 114 using Velcro™. In other implementations (not illustrated), the imaging subsystem, eyepiece subsystem, frame 100, and other components of the WNVS may be coupled to whichever type of bracing mechanism is used, using Velcro™ adhesives, or mechanical fasteners.

II. Optical Train

FIG. 3C is an illustration of the input optics, image processing electronics, and output optics of the WNVS, according to one embodiment.

II.A. Input Optics

The input optics 300 comprise at least the night vision sensors 200, and generally also include corresponding input objective lenses 104 within objective lens barrels 104. However, in other implementations additional optical elements may be used to further redirect, filter, or otherwise affect the light 306 that hits the detecting surface of the night vision sensors 200.

In the implementation illustrated in FIG. 3C, light 306 from the outside environment within the field of view of the night vision sensors travels through the input objective lenses 104 and is focused along the objective lens barrel 102 to the night vision sensors 200. The input objective lenses 104 can be re-focused by adjusting the objective lens barrel 102. This may be controlled manually or electronically via an electronic control, which may for example be incorporated into electronics 302. This adjusts the focal point of the input objective lenses 104 by changing the distance between the input objective lenses 104 and the night vision sensors 200.

II.B. Output Optics

The output optics 122 are illustrated in FIG. 3C. The output optics 122 comprise left and right displays 106 corresponding see-through eyepieces 112 (also referred to as transmissive eyepieces). In some embodiments, the output optics 122 may also include field lenses 108.

The two displays 106 display images intended for the user to view, where each display 106 receives and displays image data for one of the user's eyes from the image processing electronics 302. Specifically, the images displayed by the displays 106 represent an amplified version of the ambient light from the outside environment as captured by the night vision sensors 200, thereby allowing the user to view the outside environment in a low light situation. The images displayed may also include overlay information such as symbols or augmented objects to emphasize areas or objects in the outside environment. In one embodiment, the displays are monochrome, however in other embodiments they can display a variety of colors. These displays can be OLED devices (such as those made by eMagin, Sony or MicroOLED), transmissive LCD displays (such as those made by Kopin, among others) or reflective LCOS displays (such as those made by Forth Dimension Displays, Himax and others).

The displays 106 are physically coupled to the alignment apparatus 110 of the eyepiece subsystem. When the eyepiece subsystem is in the flipped down position, the displays are physically coupled to the alignment apparatus 110 such that the displays 106 are not in the user's forward, left, right, or downward field of view. The displays 106 are instead positioned somewhere within the user's field of view in the look up direction. The displays 106 are oriented so as to direct light in a different direction than the user's eyes, such as downward or at an angle along a vector angled differently from a vector passing outward from the user's eyes directed straight along the center of the user's field of view.

Field lenses 108 increase the field of view or otherwise change the size of the light bundle that reaches the user's eye.

Each see-through eyepiece 112 is attached to the alignment apparatus in a position relative to the displays such that the vector of light from one of the displays 106, and in some cases through a field lens 108, impinges the see-through eyepiece 112. The see-through eyepiece redirects the display 106 light causing the redirected light to travel towards the user's eye instead. The see-through eyepiece 112 is generally also attached to the alignment apparatus such that it located within the user's central field of view, though it may be offset from the vector passing outward from the user's eyes directed straight along the center of the user's field of view.

Each see-through eyepiece 112 also transmits light 306 from the outside environment so that it passes through the eyepiece and reaches the user's eyes coincidentally with the light from the displays 106. This allows the user to simultaneously view the surrounding environment and the images displayed from the displays 106. Furthermore, see-through eyepiece 112 has a size such that the user's side and bottom peripheral views remain unobstructed.

The see-through eyepiece 112 may be constructed differently depending upon the embodiment. The see-through eyepiece 112 can include a beamsplitter coating on a combiner surface designed to reflect most of the light from the display 106 and transmit little light from the outside world, to transmit most of the light from the outside world and reflect little light from the display, or any value in between, as described in Table 1. In the illustrated embodiment, the eyepiece is a freeform prism, however in other embodiments any number of different transmissive optics can be used, including waveguides, "birdbath" combiners, prisms (freeform, aspheric and others).

The see-through eyepiece 112 can be further constructed to collimate the image from the display 106 so that the user's eye can focus on that light. Otherwise, the optical path between the display 106 and the user's eye can be too short for many users to focus on the display's 106 light properly.

III. Image Processing Electronics

Figure 4A:
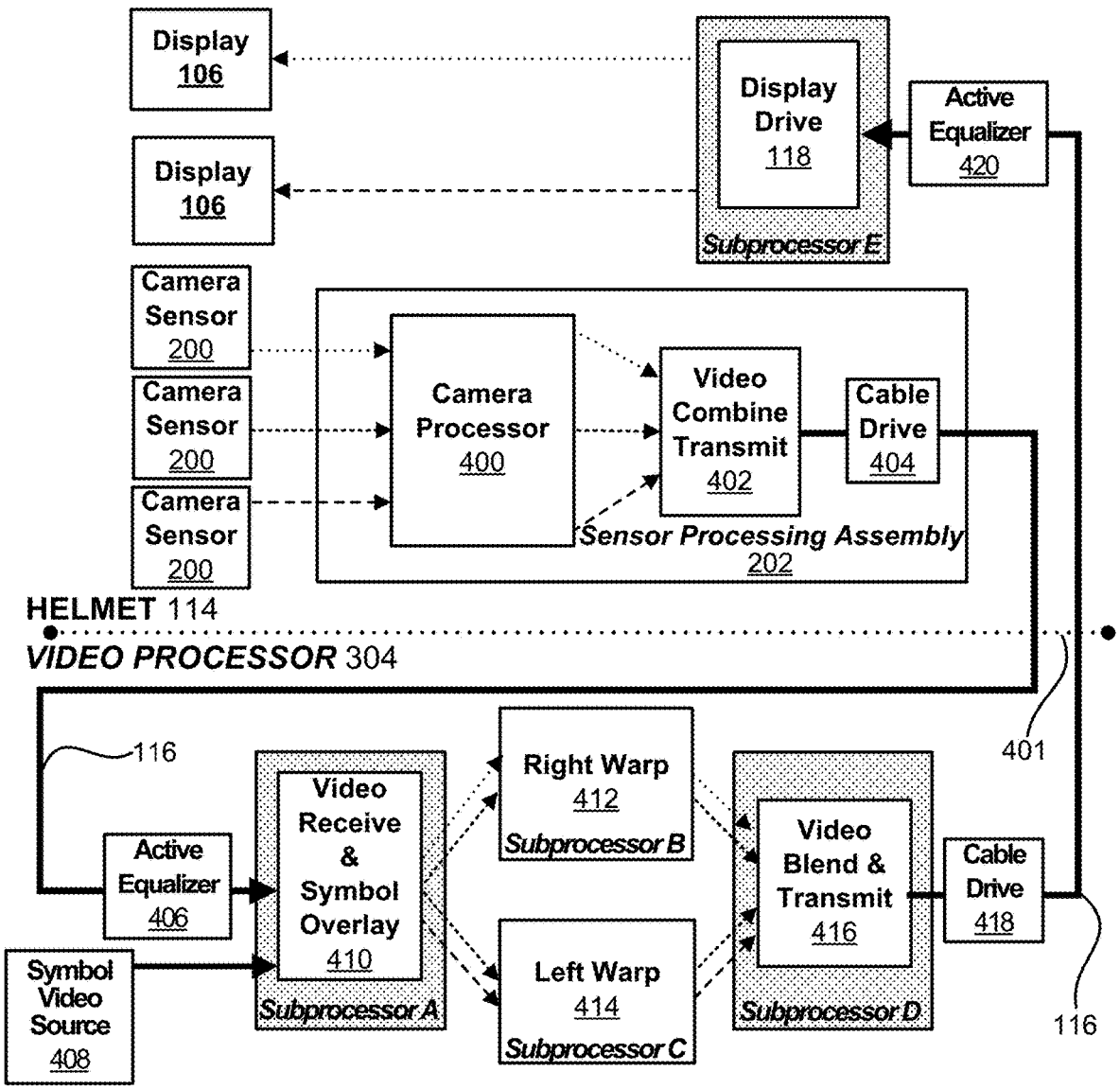
FIG. 4A is a flow diagram of the image processing pipeline of the WNVS, according to one embodiment.
Figure 4B:
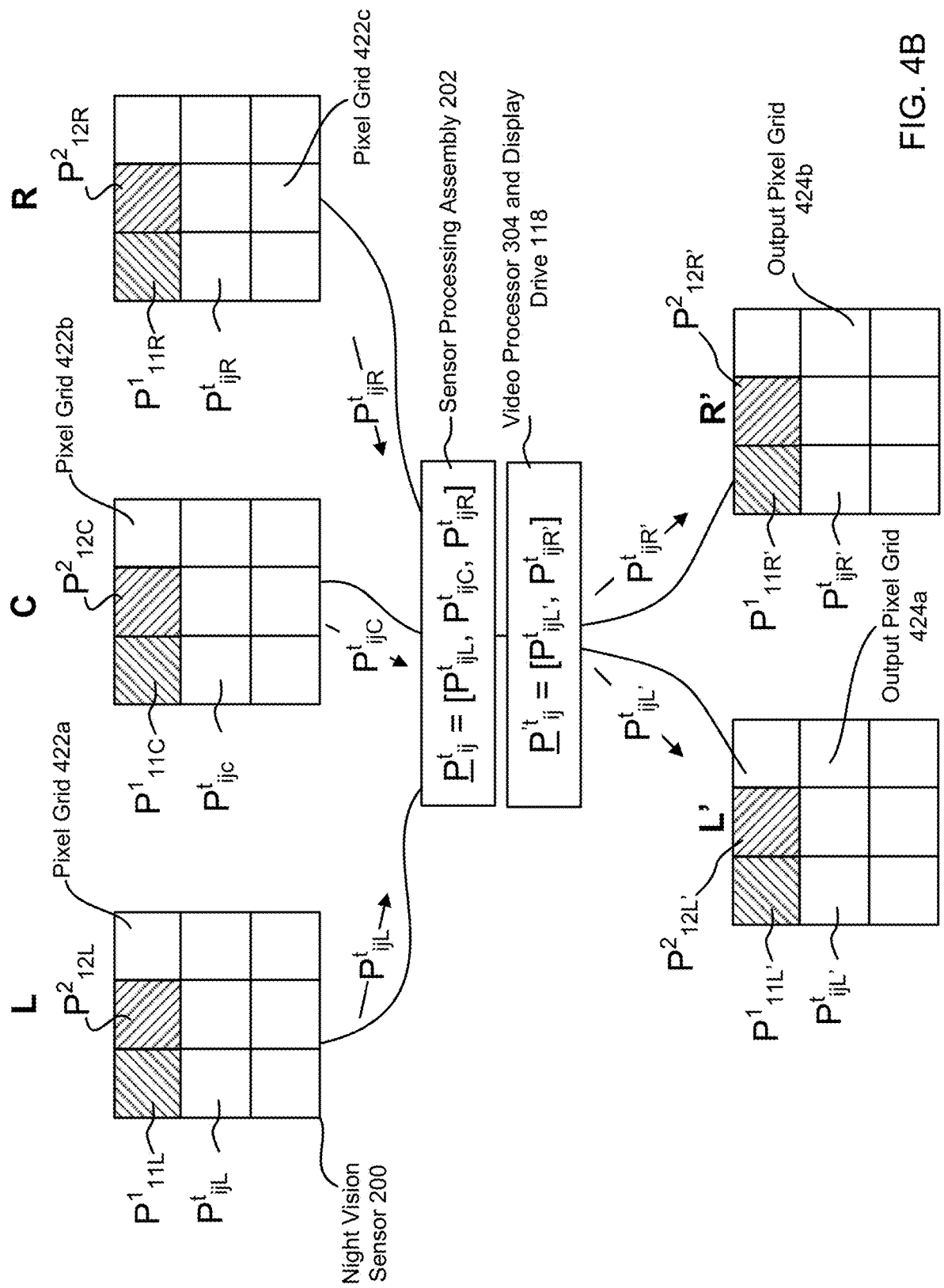
FIG. 4B is an example illustration of how pixels are processed as they pass through the image processing pipeline of the WNVS, according to one embodiment.

FIGS. 4A and 4B illustrate the image processing pipeline of the WNVS, according to one embodiment.

The WNVS includes image processing electronics 302 that implement an image processing pipeline. The image processing pipeline processes image data received by the night vision sensors 200 in order to generate images that are displayed by the displays 106. Generally, the image processing pipeline performs a number of functions. First, as the WNVS may have a different number of night vision sensors than displays 106, the image processing pipeline is configured to combine, blend, overlay, mix, fade, or otherwise manipulate the image data received from some number X of night vision sensors for proper output on some number Y of displays 106. Second, the image processing pipeline is configured to incorporate overlay information fed from a separate symbol video source 408. As previously stated, this overlay information can be symbols or augmented objects.

Third, the image processing pipeline is configured to account and correct for any warping or other distortions that result due to the various optical components that affect the ambient input light 306 received by the night vision sensors 200. This helps ensure that the light that hits the user's eyes from the displays 106 represents, as accurately as possible, the ambient input light 306 that enters the input optics 300, aside from any adjustment due to night vision amplification by the night vision sensors 200 and any added overlay information.

Fourth, the usefulness of a WNVS can depend upon its ability to process and display images of the outside environment in near real time, that is, with as little latency as possible. As a result, the image processing pipeline is configured to perform its tasks with sub-frame latency. More specifically, the image data received by the image processing pipeline is received as a pixel stream, as individual pixel values are read out from the night vision sensors 200. The image processing pipeline is configured to process the pixels in the pixel sequentially throughout the image processing pipeline where they are provided to the displays 106 for display at the end of the pipeline. At no point are pixels held and gathered for processing as an entire frame. This entirely eliminates the need for image compression or buffering, which allows for exceptionally low latencies. In some embodiments, the particular image processing electronics 302 selected to implement the pipeline facilitate the reduction in latency of image processing.

The examples of FIGS. 4A and 4B illustrate an embodiment including three night vision sensors 200 as discussed above, however one of skill in the art will appreciate that image processing electronics 302 and the image processing pipeline may be constructed to use additional or fewer night vision sensors 200. Similarly, the examples of FIGS. 4A and 4B illustrate an embodiment including two displays 106, one for each eye as discussed above, however one of skill in the art will appreciate that image processing electronics 302 and the image processing pipeline may be constructed to use additional or fewer displays 106 (e.g., multiple displays could be used per eye, or a single display could be used to provide the night vision image to both eyes).

FIG. 4A illustrates an example of the image processing electronics 302, according to one embodiment. The image processing electronics 302 can include a sensor processing assembly 202, display driver 118, a first active equalizer 406, a video receive and symbol overlay subprocessor 410, a right warp subprocessor 412, a left warp subprocessor 414, a video blend and transmit subprocessor 416, a cable drive 418, a second active equalizer 420, and a display drive subprocessor 118. The sensor processing assembly 202 includes a camera processor 400, video combine transmit 402, and a cable drive.

III.A. Sensor Processing Assembly

FIG. 4B illustrates how the image processing electronics 302 illustrated in FIG. 4A may further be understood by an example illustration of how pixels are handled as they pass through the image processing pipeline, according to one embodiment. The pixel grids 422a, 422b, and 422c represent the night vision images captured by left, center, and right (L, C, R) night vision sensors 200. The night vision sensors 200 can capture image data in a rolling shutter fashion such that each pixel is captured sequentially (e.g., from left to right, top to bottom, or vice versa). The night vision sensors 200 can also capture image data by a snapshot method (i.e., all of the sensor's pixels capture the image data for a single frame approximately simultaneously in time). Here, individual pixels are designated by $P^t_{ijX}$, where t is the time stamp or other clock or synchronization index signifying the time or order the pixel data was read out from the sensor to the camera processor 400, i is the row of the grid, j is the column of the grid, and X designates the specific night vision sensor 200 associated with grid 422a, 422b, or 422c. In the example of FIG. 4B, the sensors are assumed to capture pixels from left to right in a rolling shutter manner, such that pixel $P^1_{ijX}$ is captured before $P^2_{ijX}$, and so on. In a snap shot implementation, by contrast, all pixels from the same frame may have the same timestamp, but would still be distinguishable on the basis of their pixel grid coordinates i and j.

As the pixels, $P^t_{ijX}$, are output from each of the night vision sensors 200, they are directed, in parallel, to the sensor processing assembly 202 via a digital bus. The camera processor 400 assigns each pixel a time stamp according to a common clock, so that the set of pixels read out from all night vision sensors 200 within some small range of time are assigned the same timestamp. The clock may, for example, be the processor's 400 own internal clock, or some other externally provided clock that may be provided by another hardware element (not shown).

For clarity of description, the terms pixel and pixel value in this description can overlap in that both can refer to the amount of light captured by a given portion of the surface of the night vision sensor. Thus, the pixel $P^t_{ijX}$ encodes this amount of light, generally as a numerical value within some range supported by the night vision sensor 200. Collectively across each grid 422a, 422b, and 422c, these values make up an image. Generally, this value is monochrome, however in some embodiments these values may be multi-channel to represent color or other kinds of information.

The night vision sensor pixel values that are read out and the synchronization signal used by the camera processor 400 are time synchronized together, such that the frequency of pixel readout is the same as (or some integer multiple of) the clock period used by the camera processor 400. Further, the night vision sensors 200 are controlled (by the camera processor 400, for example) or otherwise configured to read out the same pixel position i and j (and thus the same pixel) from all of the sensor grids 422a, 422b, and 422c at the same time (to within the same time period of a single pixel readout). Using the example of FIG. 4B, this means that $P^1_{11L}$ is read out at the same time as $P^1_{11C}$, which is read out at the same time as $P^1_{11R}$, and all three are received by the camera processor 400 such that they are assigned a same time stamp. For a rolling shutter process, this continues as pixels are read out, for example for $P^2_{12L}$, $P^2_{12C}$, $P^2_{12R}$, and so on. This continues for all pixels in the pixel grids 422a, 422b, and 422c, and then repeats for future image frames starting from $P^1_{11X}$, and so one. This generates a stream of pixels that preserves the order of timestamps to pixel grid positions throughout the rest of the image processing process, all synced by the clock of the camera processor 400. This avoids frame tearing (processing pixels from different sensors together that were captured at different times), avoids dropped frames (as there is no whole frame processing), and also avoids latency variability. For a snap shot implementation, all pixels are captured simultaneously but are processed through the remainder of the image processing pipeline in a fixed order which may vary by implementation.

III.B. Video Processor

The individual pixels, $P^t_{ijX}$, from each sensor 200 are sent by the camera processor 400 to the video combine transmit 402 where they are combined with pixels with the same time stamp, for convenience of description referred to as $\underline{P}^t_{ij}=[P^t_{ijL}, P^t_{ijC}, P^t_{ijR}]$, to create a single pixel stream (e.g. $\underline{P}^1_{11}, \underline{P}^2_{12}, \underline{P}^3_{21}, \underline{P}^4_{22}, \ldots$).

The pixel stream is transmitted further through the electronics 302 for additional processing. In the illustrated implementation, this involves passing the pixel stream from the sensor processing assembly 202 to a video processor 304. However, in practice the sensor processing assembly 202 and the video processor 304 may be part of the same component such as a single processor, or their respective functions may be otherwise subdivided between two or more components.

Returning to the illustrated embodiment, the passing of the pixel stream occurs by transmitting the pixel stream from the cable drive 404 of the sensor processing assembly 202, through a coaxial cable such as an RG 179 cable, through an active equalizer 406 to the video processor 304. The cable drive 404 and 418 provide the proper signal strength and impedance to the coaxial cable and receiver (in this case, the active equalizer 406 and 420). As previously discussed, in one implementation the video processor 304 includes four subprocessors (A-D). The subprocessors are integrated circuits that can be any combination of field-programmable gate arrays (FPGA) or application-specific integrated circuits (ASIC). In alternate implementations, additional or fewer subprocessors, or the processing of the image processing pipeline carried out by the video processor 304 or any other components used may be otherwise divided. Thus, the discussion with respect to which subprocessor carries out each of the following tasks in the image processing pipeline is merely for the sake of example.

Subprocessor A 410 receives and unpacks the serial stream $\underline{P}^t_{ij}$ into discrete pixels streams separated each pixel grid 422a, 422b, 422c (e.g., $P^t_{ijL}$, $P^t_{ijC}$, and $P^t_{ijR}$) for processing. Subprocessor A 410 also receives overlay information, from a symbol video source 408, for overlay onto the images that will be ultimately displayed by the displays 106. The overlay symbol values are themselves, or can be converted into, pixel indices in the grid space of one or more of the sensors (e.g., i and j position for center sensor C). To perform the overlay, subprocessor A 410 overlays the overlay symbol data on the received pixel stream based on the determined indices for overlays. Subprocessor A 410 can accomplish this by overlaying, overwriting, or combining the pixel value of an overlay pixel with the pixel value from the pixel stream.

Since the illustrated WNVS will often have a different number of night vision sensors 200 from the number of displays 106, the video processor 304 supports manipulation of the input pixel stream having X channels (e.g., based on the number of night vision sensors 200, three in the illustrated implementation: left channel, right channel, and center channel) into an output pixel stream having Y channels (e.g., based on the number of displays 106, generally two, one for each eye). To accomplish this, the manipulation involves selectively passing input channels, or portions of input channels, into different subprocessors (or different processing pipelines of a single subprocessor. Each subprocessor (or different part of the processing pipeline) receives the indicated input channels and generates one of the output channels.

In the illustrated embodiment, for example, all pixels intended for display on the left (L') output pixel grid 424a, $P^t_{ijL'}$, are directed to the left warp subprocessor C 414, while pixels intended for the right (R') output pixel grid 424b, $P^t_{ijR'}$, are directed to the right warp subprocessor B 412.

Stated differently, this means that the left and center channels are passed to the left warp subprocessor C 414, and the center and right channels are passed to the right warp subprocessor B 412. Stated more generally, in this implementation, the channel from the central night vision sensor 200 will end up being displayed partly on the left display 106 and partly on the right display 106.

Subprocessors B 412 and C 414 carries out the manipulation of the input channels to arrive at the output channel. This can involve a number of processes. The first is blending to combine a portion of one input channel with a portion of another input channel to arrive at the output channel for a single display 106. The second is correcting for binocular rivalry (luning) effects that can be introduced at the overlap in the user's field of view with respect to both eyes, which is corrected at the inner edge between the output channels between those eyes. The third is to correct for distortions due to the optics of the WNVS. As above, these processes are carried out on pixel by pixel basis as the pixel streams of the input channels pass through the image processing pipeline.

Subprocessors B 412 and C 414 perform blending by crossfading the overlapping channel data to arrive at the pixel value for the corresponding output channel. Using the illustrated implementation as an example, since the field of view of the central sensor 200 overlaps with the field of view of the left and right sensors 200, repetitious pixels are captured and present in the pixel stream received at video processor 304. To correct for this, repetitious image data from one feed (e.g. the left sensor 200) is "washed out" as the same repetitious image data from another feed (e.g. the center sensor 200) is "washed in." Subprocessor A 410 contains computer code, such as a lookup table, that identifies which pixels in a given output channel overlap with which pixels in a given pair of input channels that overlap for that pixel. Subprocessor A 410 further contains computer code that dictates what contribution each input channel contributes to the "overlapped" pixel value of the output channel. To perform the blend, for given pixel values $P^t_{ijX}$, $P^t_{ij(X+1)}$ from a first and second given pixel grid (e.g., left grid 422a, center grid 422b), an output pixel value $P^t_{ijZ'}$ is determined, where $P^t_{ijZ'}$ is some proportion of the pixel values $P^t_{ijX}$, $P^t_{ij(X+1)}$. Generally, this contribution/proportion is different for each pixel that is being blended, starting with a proportion that is mostly from the first pixel grid (e.g. grid 422a) nearer to that first grid's exclusive field of view, and generally shifting towards being mostly from the second pixel grid (e.g. grid 422b) nearer to that second grid's field of view.

Subprocessors B 412 and C 414 correct for luning effects in a similar manner. The innermost pixels of the blended output channels from the prior manipulation (e.g., left and right output channels in a two display implementation) are "washed out" in pixel value by lowering those pixel values from full intensity further from the inner edge of the output channel down to a lower value (e.g., 50% or less) at the innermost edge of that output channel. The effect of this is that pixel output by the displays 106 will have a lower intensity at the inner edges of the displays 106, and thus the light reaching the user's eyes at these locations is lowered. However, due to how human eyes process light, this corrects for the fact that the human eye is expecting to be looking at the same ambient light from the same point in space, when due to the WNVS system, it is actually seeing light appearing to come from that point in space which is instead light generated by two separate displays. By bringing the pixel values at these points lower (e.g., 50%) the brightness the human eye expects to see is corrected for.

Subprocessors B 412 and C 414 correct the pixel data so as to cancel out image distortions that are introduced at any point in the optical light paths, including those from the outside environment through the input optics 300 to the night vision sensors 200, and including from the displays 106 through the output optics 122 to the human eye. The overall goal is to have the night vision image appear as it would if the user were viewing that light themselves, merely amplified to provide night vision. An example distortion that is corrected for is a pin cushion distortion, however other corrections are also possible and may vary by implementation. In one embodiment, subprocessor B 412 and C 414 each are associated with and can access an associated distortion map designed to correct for all distortions already identified to be present in the optics of the system. This distortion map may be a part of or different from any other lookup tables or other data structures used for performing the blending and other manipulation processes described above. Generally, the distortion maps will be unique to the design of the WNVS, and may further be from the output optics 122.

The output from subprocessor B 412 and subprocessor C 414 is directed to subprocessor D 416. In subprocessor D 416, pixels for the left and right output pixel grids 424a and 424b, $P^{t}{}_{ijL}$, and $P^{t}{}_{ijR}$, are grouped according to their time stamp, $\underline{P}^{t}{}_{ij} = [P^{t}{}_{ijL}, P^{t}{}_{ijR}]$ into an output pixel stream (e.g. $\underline{P}^{1}{}_{11}, \underline{P}^{2}{}_{12}, \underline{P}^{3}{}_{21}, \underline{P}^{4}{}_{22}, \ldots$) and passed to a display drive 118 to provide display data to the displays 106. In one embodiment, the output pixel stream is sent via another coaxial cable 116 (e.g., again RG 179), through another active equalizer 420 to the display drive 118.

The display drive 118 de-groups the output stream received from subprocessor D 416 and transcodes the pixels to the left and right output pixel grids 424a and 424b of the displays 116. In one embodiment, the display drive 118 is coupled to the displays 106 via HDMI cables, however any suitable data format and cable can be used. Similar to the subprocessors A-D, the display drive 118 can be an ASIC or FPGA. Alternatively, display drive 118 and subprocessor E may be omitted and its functionality may be incorporated into the displays 106 or the video processor 304.

III.C. Electronics Placement and Organization.

Although the various portions of the image processing pipeline have been described with respect to a particular example electronics architecture 302, and have been divided along the pipeline according to a particular breakdown of functionality between the sensor processing assembly 202 and the video processor 304, in practice, any combination of electronics that perform the above discussed functions may be used. In the illustrated embodiment, the sensor processing assembly 202, sensors 200, and related coupling circuitry are located within frame 100, and the video processor 304 and related circuitry are located outside the housing 100 either in a separate unit mounted elsewhere on the helmet 114 (not shown), or off helmet entirely. This particular physical arrangement of electronics 302 and cabling is merely one particular embodiment, and other embodiments may differently arrange the elements on or off the helmet.

IV. Example Embodiments

Table 1 below further provides further specifications and performance metrics of an example embodiment of the WVNS according to one embodiment. Other embodiments are also envisioned. As a particular, different night vision sensors 200 may be used with different fields of view and thus also different overlaps between sensors. Further, different numbers of night vision sensors 200 and displays 106 may be used.

TABLE 1

Example Design

| | |
|---|---|
| FOV (degrees) | Horizontal: min 10°; max 180° |
| | Vertical: min 5°; max 90° |
| Overlap (degrees) | Min: 10° |
| | Max: Full Overlap (100%) |
| On-axis Exit Pupil Diameter | Min: 5 mm |
| | Max: 50 mm |
| Off-axis Exit Pupil Diameter | Min: 3 mm |
| | Max: 50 mm |
| Eye Relief (mm) | Min: 5 mm |
| | Max: 75 mm |
| Head Supported Weight (pounds, w/mount) | Min: 0.2 lb. |
| | Max: 10 lb. |
| Eyepiece Focus | Min: −6D |
| | Max: +2D |
| System Resolution MTF(Quarter Moon, on axis) | Min: 0.2 cycle/mrad |
| | Max: 3.5 cycle/mrad |
| Forward Projection | Deployed: |
| | Min: 0.5" |
| | Max: 8" |
| | Stowed: |
| | Min: 0" |
| | Max: 6" |
| Distortion (Compensated) | Min: none |
| | Max: 10% |
| Helmet Interface | Any helmet, soft head gear, or handheld device |
| Update Rate | Min: 30 Hz |
| | Max: 480 Hz |
| Latency | Min: 0 msec |
| | Max: 100 msec |
| Prism Reflectance | Min: 10% |
| | Max: 90% |
| Prism Transmittance | Min: 10% |
| | Max: 90% |

V. Additional Considerations

Terms such as "optical" or "light" are not intended to be limited to any one specific wavelength range. Nor are they meant to be limited to the visible region of the electromagnetic spectrum.

Some embodiments may be described using the expression "coupled" or "connected." It should be understood that these terms are not intended as synonyms for each other. The term "connected" indicates that the connected elements are in direct physical, electrical, or optical contact with each other. The term "coupled" includes the case where the coupled elements are in direct physical, optical, or electrical contact but it also includes the case where the coupled elements are not in direct contact with each other, but still co-operate or interact with each other. In particular, there may be intervening elements.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein without departing from the spirit and scope defined in the appended claims.

What is claimed is:

1. A night vision system comprising:
a count of X digital night vision sensors configured to capture video of an exterior environment, the video comprising X input channels, each digital night vision sensor associated with one of the input channels, each input channel comprising frames and each frame comprising a plurality of pixels;
imaging electronics comprising:
a sensor processing assembly configured to receive the captured video from the X digital night vision sensors as X parallel pixel streams of the input channels, the sensor processing assembly time synchronizing corresponding pixels in the X pixel streams without using complete frames containing the pixels by time synchronizing the X digital night vision sensors so that the X digital night vision sensors begin a readout cycle in phase with each other, the sensor processing assembly outputting at least one stream comprising the time-synchronized pixels; and
a video processor configured to receive the at least one stream comprising the time-synchronized pixels, the video processor processing the received stream to generate a count of Y pixel streams of output channels;
an eyepiece subsystem comprising:
a count of Y displays, each receiving one of the Y pixel streams of output channels; and
a plurality of transmissive eyepieces, each transmissive eyepiece associated with one of a user's eyes, each transmissive eyepiece redirecting light from at least one of the displays towards the associated eye, each transmissive eyepiece also transmitting light from the exterior environment towards the associated eye; and
a frame physically coupled to the night vision sensors and the eyepiece subsystem.

2. The night vision system of claim 1 wherein the digital night vision sensors do not include an image intensifier (P tube).

3. The night vision system of claim 1 wherein X is three.

4. The night vision system of claim 3 wherein:
a left one of the digital night vision sensors is oriented off axis to the left from a center one of the digital night vision sensors;
a right one of the digital night vision sensors is oriented off axis to the right from the center digital night vision sensor; and
the center night vision sensor is oriented forwards so that when the night vision system is used by a user, the center sensor is located at a center of a user's field of view.

5. The night vision system of claim 1 comprising:
wherein at least one digital night vision sensor is oriented off axis relative to another digital night vision sensor.

6. The night vision system of claim 1 wherein the frame comprises a unitary construction.

7. The night vision system of claim 6 wherein the frame is an additive metal fabrication.

8. The night vision system of claim 1 further comprising:
an imaging subsystem including the night vision sensors and the imaging electronics.

9. The night vision system of claim 8 wherein the eyepiece subsystem further comprises:
an alignment apparatus physically coupling the eyepiece subsystem to the imaging subsystem, the alignment apparatus configured to allow motion of the eyepiece subsystem relative to the imaging subsystem.

10. The night vision system of claim 9 wherein the alignment apparatus is configured to reposition a count of Y output optics including the displays relative to the user's eyes.

11. The night vision system of claim 1 wherein the count of night vision sensors X is greater than the count of displays Y.

12. The night vision system of claim 1 further comprising:
at least one objective lens located along an optical path between an exterior environment and each of the night vision sensors.

13. The night vision system of claim 1 wherein each transmissive eyepiece is partially mirrored along a redirect surface such that light from an associated one of the displays reflects off of a combiner surface towards the associated eye.

14. The night vision system of claim 13 wherein the partial mirroring allows light from an exterior environment to pass through the redirect surface towards the associated eye.

15. The night vision system of claim 1 further comprising:
at least one objective lens located along an optical path between each of the displays and the associated eye.

16. The night vision system of claim 1 wherein the sensor processing assembly is configured to synchronize the received X pixel streams so that a same pixel grid location is received at a same time from each of the X input pixel streams.

17. The night vision system of claim 1 wherein the video processor is configured to serially process groups of time-synchronized pixels in the at least one stream, wherein each group comprises a pixel received from each of the X pixel streams.

18. The night vision system of claim 1 wherein the video processor comprises:
a subprocessor configured to combine the at least one stream with a symbol video source to incorporate heads up display (HUD) overlay information.

19. The night vision system of claim 1 wherein the video processor is configured to blend pixels to generate each of the Y pixel streams to account for overlap in field of view between the digital night vision sensors.

20. The night vision system of claim 19 wherein:
the X digital night vision sensors comprise a left sensor, a right sensor, and a center sensor;
the Y displays comprise a left display and a right display;
the video processor is configured to blend a pixel from the left sensor with a pixel from the center sensor to generate a left output pixel stream; and
the video processor is configured to blend a pixel from the right sensor with a pixel from the center sensor to generate a right output pixel stream.

21. The night vision system of claim 20 wherein the video processor is configured to correct the at least one stream to account for luning between at least two of the Y pixel streams.

22. The night vision system of claim 1 wherein the video processor comprises a lookup table to correct optical distortion introduced by optical components of the night vision system.

23. The night vision system of claim 1 wherein the imaging electronics are configured to have a latency of not more than 100 milliseconds.

24. The night vision system of claim 1 wherein the imaging electronics are configured to have a sub-frame latency.

25. The night vision system of claim 1 wherein the imaging electronics do not store an entire frame of pixels in a buffer.

* * * * *